US008514519B2

(12) United States Patent
Gurney et al.

(10) Patent No.: US 8,514,519 B2
(45) Date of Patent: Aug. 20, 2013

(54) DEVICE FOR GENERATING HIGH FREQUENCY MAGNETIC FIELDS IN A REST-FRAME OF A MAGNETIC MEDIUM (75) Inventors: Bruce Alvin Gurney, San Jose, CA (US); Manfred Ernst Schabes, Saratoga, CA (US); Bruce Alexander Wilson, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 776 days.

(21) Appl. No.: 12/603,443

(22) Filed: Oct. 21, 2009

(65) Prior Publication Data
US 2011/0090594 A1    Apr. 21, 2011

(51) Int. Cl.
G11B 5/187    (2006.01)
G11B 5/127    (2006.01)

(52) U.S. Cl.
USPC ............... 360/125.3; 360/125.71; 360/128

(58) Field of Classification Search
USPC ............... 360/128, 125.3, 125.31, 125.71, 360/125.74
See application file for complete search history.

(56) References Cited

U.S. PATENT DOCUMENTS

| | | | |
|---|---|---|---|
| 4,103,315 A | 7/1978 | Hempstead et al. | 360/110 |
| 5,436,781 A | 7/1995 | Matono et al. | 360/126 |
| 5,815,342 A | 9/1998 | Akiyama et al. | 360/97.01 |
| 6,456,467 B1 * | 9/2002 | Mao et al. | 360/319 |
| 6,785,092 B2 | 8/2004 | Convington et al. | 360/126 |
| 6,809,900 B2 | 10/2004 | Covington | 360/126 |
| 7,057,837 B2 * | 6/2006 | Gill | 360/55 |
| 7,110,287 B2 * | 9/2006 | Huai et al. | 365/171 |
| 7,221,538 B2 * | 5/2007 | Kawato et al. | 360/125.04 |
| 7,262,936 B2 * | 8/2007 | Hamann et al. | 360/128 |
| 7,292,414 B1 * | 11/2007 | Mallary | 360/324 |
| 7,397,633 B2 | 7/2008 | Xue et al. | 360/125.3 |
| 7,525,773 B2 * | 4/2009 | Shimazawa et al. | 360/324.11 |
| 7,554,765 B2 * | 6/2009 | Shukh et al. | 360/125.12 |
| 7,561,379 B2 * | 7/2009 | Li et al. | 360/125.24 |
| 2004/0228031 A1 | 11/2004 | Takeo | 360/125 |
| 2004/0233578 A1 | 11/2004 | Gao | 360/125 |
| 2006/0098334 A1 * | 5/2006 | Jayasekara et al. | 360/125 |
| 2006/0164759 A1 * | 7/2006 | Okada et al. | 360/126 |
| 2008/0117545 A1 | 5/2008 | Batra et al. | 360/125.01 |
| 2008/0239542 A1 | 10/2008 | Yuasa et al. | 360/59 |
| 2008/0304176 A1 | 12/2008 | Takagishi et al. | 360/86 |
| 2009/0052095 A1 | 2/2009 | Yamada et al. | 360/324 |
| 2009/0080109 A1 | 3/2009 | Fukuzawa et al. | 360/122 |
| 2009/0080120 A1 | 3/2009 | Funayama et al. | 360/319 |
| 2010/0214692 A1 * | 8/2010 | Kief et al. | 360/125.03 |

FOREIGN PATENT DOCUMENTS

| | | |
|---|---|---|
| JP | 7244801 | 9/1995 |
| JP | 2005/032330 | 2/2005 |
| JP | 2007/080414 | 3/2007 |

* cited by examiner

*Primary Examiner* — Will J Klimowicz
(74) *Attorney, Agent, or Firm* — Zilka-Kotab, PC (57) ABSTRACT

A magnetic head having a magnetic wiggler structure for initiating a high frequency magnetic oscillation in a magnetic to improve media-writeability and increase data density. The wiggler structure includes a plurality of magnetic layers that are antiparallel coupled with one another across non-magnetic antiparallel coupling layers. The wiggler structure is arranged just up-track from the point of data writing so that the high frequency oscillation is initiated just prior to the writing of data on the magnetic media.

19 Claims, 9 Drawing Sheets

FIG. 9 ically to a magnetic head that
includes a magnetic wiggler structure for inducing magnetic
oscillations in a magnetic medium prior to data recording in
order to improve media-writeability and data density in a
magnetic data recording system.

DEVICE FOR GENERATING HIGH FREQUENCY MAGNETIC FIELDS IN A REST-FRAME OF A MAGNETIC MEDIUM

FIELD OF THE INVENTION

The present invention relates to magnetic heads for data recording, and more particularly to a magnetic head that includes a magnetic wiggler structure for inducing magnetic oscillations in a magnetic medium prior to data recording in order to improve media-writeability and data density in a magnetic data recording system.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos θ, where θ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data density and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

In magnetic recording system technology there is a need to continually increase the data density. One way to increase the bit density in conventional perpendicular media systems is to decrease the grain size. However, smaller grains may become thermally unstable unless the internal anisotropy energy of their grains is increased. Yet this may make grains difficult to write on using a conventional write head. One proposed means increasing the effectiveness of the write process (increasing media-writeability) has been to include micro-wave assisted magnetic recording systems (MAMR). Such systems can include an auxiliary high-frequency coil or an auxiliary spin torque oscillator in the magnetic head structure. However the use of such a structure requires considerable additional expense, in both the construction of such a device and also in the necessary additional circuitry needed to drive such a device. The use of such a device also requires additional valuable real estate on the slider for making contact with the additional circuitry. Therefore, there remains a need for a practical cost-effective mechanism for increasing data density in a magnetic data recording system.

SUMMARY OF THE INVENTION

The present invention provides a head for magnetic data recording that includes a magnetic write head having a magnetic write pole that extends to an air bearing surface. A wiggler structure is disposed at the air bearing surface. The magnetic wiggler structure includes a plurality of antiparallel coupled magnetic layers for initiating a high frequency magnetic field oscillation in a magnetic media passing thereby.

The wiggler structure is generally a structure of magnetic layers and interspersed non-magnetic spacer layers where the magnetization direction of the magnetic layers is substantially constant during the operation of the device, substantially in the plane of said magnetic layers and at large angles to the exterior surface of the wiggler near the ABS. Preferably, the directions of magnetization of adjacent magnetic layers of the wiggler are substantially opposite to each other as may be accomplished by means of suitable coupling layers.

The wiggler can be in close proximity to the write pole. It is physically separated by a thin spacer layer such that no appreciable exchange coupling exists between the wiggler and the pole of the write head. The magnetization of the magnetic layers of the wiggler structure stay at large angles relative to the ABS surface during operation of the head when magnetostatic stray fields from the head may impinge on the wiggler layers.

The presence of the wiggler structure just up-track from the point of data writing improves the media writeability by adding an oscillatory high-frequency magnetic field in the rest frame of the media, thereby improving writer performance, increasing data density and reducing the amount of primary write field needed to magnetize the media.

The wiggler structure can be used in a perpendicular magnetic recording system, and can also be used in a longitudinal data recording system. In one embodiment of the invention, the thicknesses of the various magnetic layers of the wiggler structure can be varied to produce a broadband magnetic chirp.

In yet another embodiment, the wiggler structure can be configured with a somewhat trapezoidal shape to increase efficiency at high skew angles. In order to further increase the efficiency of the wiggler structure at high skew angles, the thicknesses of the individual magnetic layers of the wiggler structure can vary so that they are all thicker at one side than at the other. This configuration can be provided to maintain a desired magnetic oscillation frequency at various skew angles.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
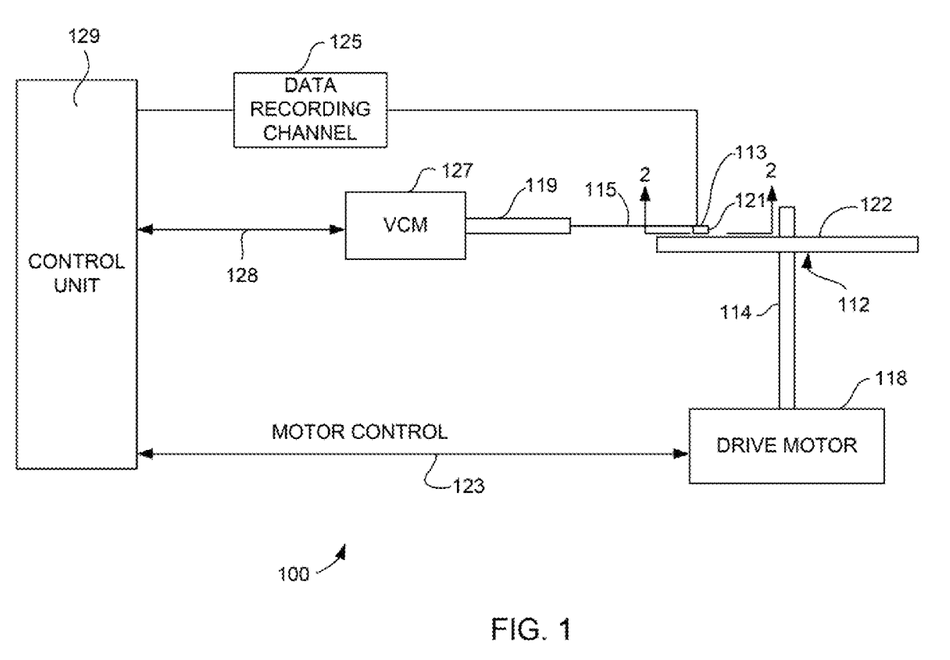
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
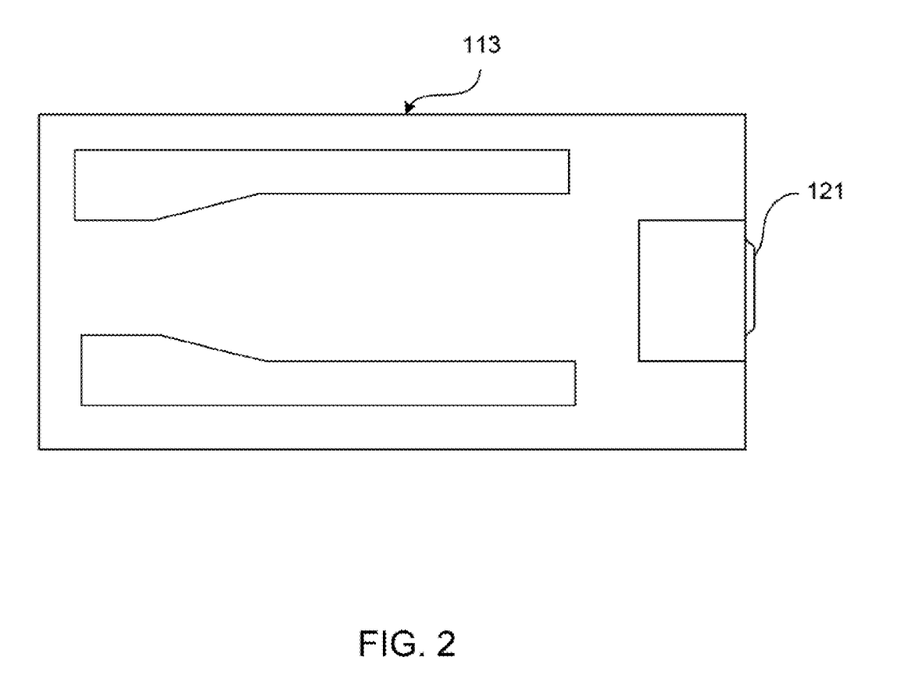
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
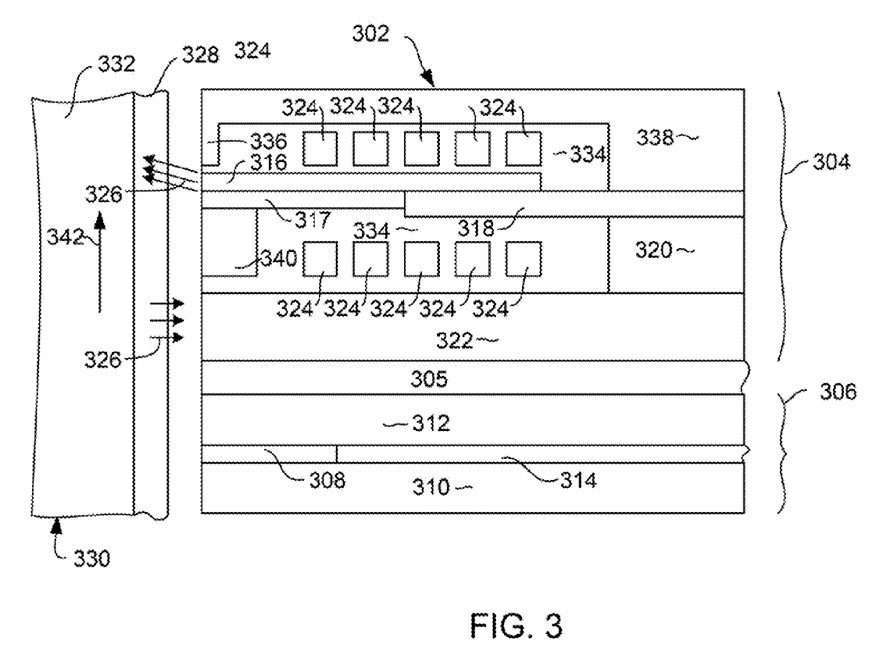
FIG. 3 is a cross sectional view of a perpendicular magnetic head according to an embodiment of the present invention.

With reference now to FIG. 3, the invention can be embodied in a magnetic head 302 that includes a magnetic write head 304 and a magnetic read head 306, which may be separated from one another by a non-magnetic, electrically insulating layer 305. The read head 306 can include a magnetoresistive sensor 308 such as a giant magnetoresistive sensor (GMR) tunnel junction magnetoresistive sensor (TMR) or some other suitable sensor. The sensor 308 can be sandwiched between first and second magnetic shields 310, 312 and embedded in an electrically insulating fill layer 314.

The write head 304 can be a perpendicular magnetic recording head, and can include a magnetic write pole 316, shaping layer 318, back gap layer 320 and magnetic return pole 322 which are connected with one another so as to form a magnetic yoke, with the write pole 316 and return pole 322 each extending to an air bearing surface (ABS). An electrically conductive coil 324 induces a magnetic flux through the yoke formed by the write pole 316, shaping layer 318 back gap 320 and return pole 322, which causes a magnetic write field 326 to emit from the tip of the write pole 316. This write field 326 locally magnetizes a magnetically hard top layer 328 of an adjacent magnetic medium 330. This write field travels through a magnetically soft under-layer 332 of the magnetic medium to return to the return pole 322, where the write field 326 is sufficiently spread out that it does not erase the signal imprinted on the magnetically hard top layer 328 of the magnetic medium 330. The write coil 324 (shown in cross section in FIG. 3) can pass above and below the write coil 316 as shown in FIG. 3, and can be embedded in a non-magnetic, electrically insulating material 334 such as alumina.

A trailing magnetic shield 336 can be provided adjacent to and separated from the trailing edge of the write pole 316. The trailing magnetic shield increases field gradient by attracting the magnetic write field 326 and thereby slightly canting the write field 326 at an angle. The trailing magnetic shield 336 can be magnetically connected with the back gap 320 and shaping layer 318 by a trailing return pole 338.

With continued reference to FIG. 3, a magnetic wiggler structure 340 is provided just up-track from the write pole. The magnetic medium 330 moves in a direction indicated by arrow 342. Therefore, as shown in FIG. 3, the wiggler structure 340 is located adjacent to the leading edge of the write pole 316.

The wiggler structure 340 (also shown in greater detail in FIG. 5) is generally a structure of magnetic layers 502, 504 and interspersed non-magnetic spacer layers 506 where the magnetization direction of the magnetic layers 502, 504 is substantially constant during the operation of the device, substantially in the plane of said magnetic layers 502, 504 and at large angles to the exterior surface of the wiggler near the ABS. Preferably, the directions of magnetization of adjacent magnetic layers 502, 504 of the wiggler 340 are substantially opposite to each other as may be accomplished by means of suitable coupling layers 506.

Figure 5:
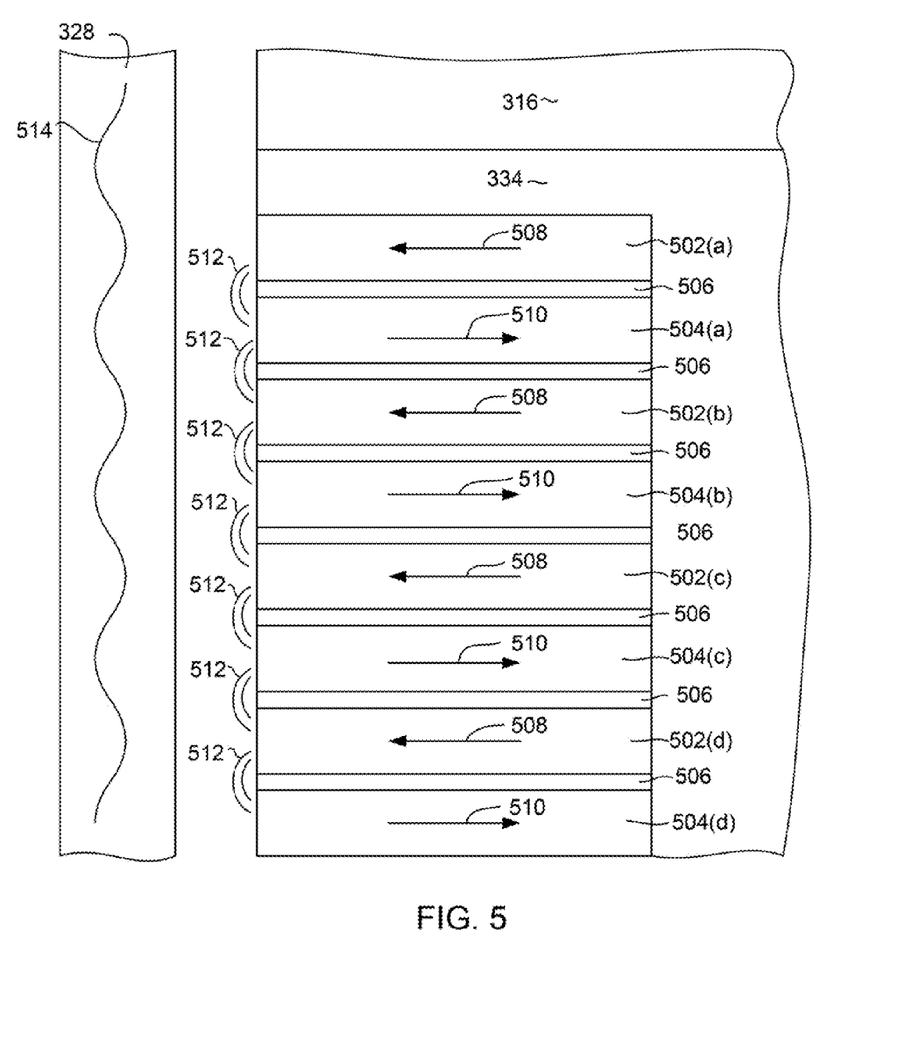
FIG. 5 is an enlarged view of a magnetic wiggler structure according to an embodiment of the invention.

The wiggler 340 can be in close proximity to the write pole 316. It is physically separated from the write pole 316 by a thin non-magnetic spacer layer 317 such that no appreciable exchange coupling exists between the wiggler and the pole of the write head. The magnetization of the magnetic layers 502, 504 of the wiggler stay at large angles relative to the ABS surface during operation of the head when magnetostatic stray fields from the head may impinge on the wiggler layers.

The wiggler structure 340 sets up small magnetic variations or oscillations in the hard magnetic layer 328 of the magnetic medium 330. These oscillations increase the writeability of the magnetic medium, thereby allowing increased data density.

With reference to FIG. 5, the structure and function of the wiggler structure 340 can be seen in greater detail. The wiggler structure 340 includes a plurality of antiparallel coupled magnetic layers 502(a-d), 504(a-d). One set of the magnetic layers 502(a-d) has a magnetization 508 that is oriented in a first direction that is perpendicular to the air bearing surface (ABS), while the other set of magnetic layers 504(a-d) has a magnetization 510 that is oriented in a second direction perpendicular to the ABS, the second direction being antiparallel with the first direction. Each of the magnetic layers 502 is antiparallel coupled with an adjacent magnetic layer 504 by a thin non-magnetic antiaprallel coupling layer 506 disposed between each of the magnetic layers 504, 502. The non-magnetic antiaparallel coupling layer can be a material such as Ru, Rh, Ir, Cr, Re, V, or alloys thereof, or other alloys commonly used in synthetic antiferromagnets. The antiparallel coupling layers 506 can each have a thickness of about 4 Angstroms. Each of the pinned magnetic layers 502, 504 can be constructed of a material such as Co, Fe, CoFe, Cu, Ni or alloys thereof. Other magnetic materials may be suitable as well. While the wiggler structure 340 shown in FIG. 5 is shown having 8 magnetic layers 502, 504, the number of magnetic layers can vary depending on design requirements. However, the wiggler 340 preferably has at least 4 magnetic layers.

As can be seen, the wiggler structure 340 is embedded in an electrically insulating, non-magnetic material layer 334 such as alumina, and is separated from the write pole 316. The magnetizations 508, 510 of the magnetic layers 502, 504 are oriented so that they cause magnetic fields 512 to emit from the ABS. The magnetic field emanating from the surface alternates the sign, because the adjacent magnetic layers are substantially antiprallel due to the antiparallel coupling through the non-magnetic layers.

The magnetic fields 512 from the wiggler structure 340 set up a transverse field 514 in the magnetic media 328 that oscillates at a high frequency according to the ratio of the relative velocity of the magnetic medium 328 and the sum of the thicknesses of two adjacent magnetic layers 502, 504 and the spacer layer 506. This oscillating magnetic field 514, which is located in the rest frame of the magnetic medium, increases the writeability of the magnetic medium, allowing for increased data density. Resonance frequencies of the media depend on many parameters, including the internal anisotropy and demagnetization fields within the media 328, which may be used to tune the required frequency of the applied high frequency field 514. Furthermore it is possible to use composite bit-patterned media islands that contain magnetically hard and magnetically soft materials to form exchange spring structures and thus allow further tuning of the spectral response during switching.

Various mechanisms may be employed to maintain and pin the magnetizations 508, 510 of the magnetic layers 502, 504. For example, one or more of the magnetic layers 502, 504, preferably the outermost layers, can be constructed of a hard magnetic material such as CoPt or CoPtCr. If it extends to the ABS as do the other layers, then this magnetically hard layer preferably has a magnetic thickness that is about the same as the other magnetic layers 502, 504. On the other hand, if this layer is made thicker than the other layers for increased pinning, then this hard magnetic layer should be recessed from the ABS in order to avoid erasing data or inadvertently writing data to the media 328.

Figure 6:
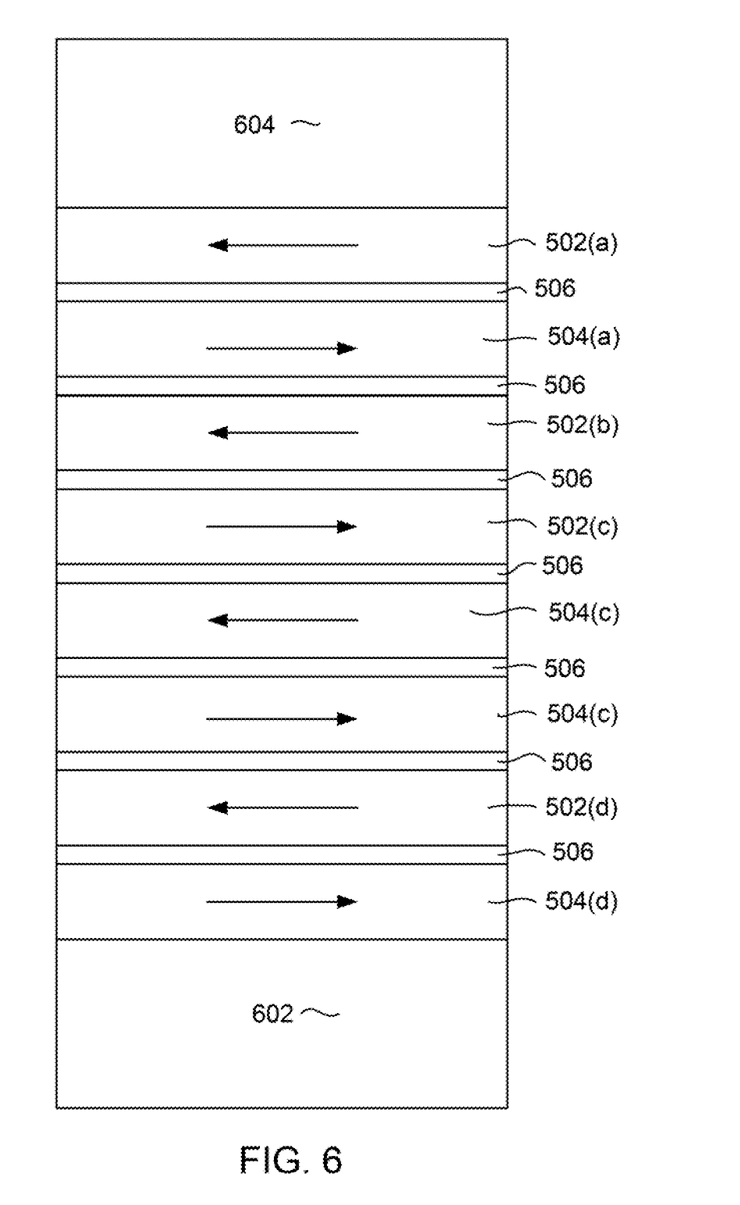
FIG. 6 is an enlarged view of a magnetic wiggler structure according to another embodiment of the invention.

With reference to FIG. 6, another mechanism for pinning the magnetization of the magnetic layers 302, 304 is to provide one or more layers of antiferromagnetic material (AFM layer) 602, 604, which is exchange coupled with one of the magnetic layers 502, 504. For example, as shown in FIG. 6, the AFM layer 602 is exchange coupled with the magnetic layer 504(d) and the other AFM layer 604 is exchange coupled with magnetic layer 502(a). The AFM layers 602, 604 can be constructed of a material such as PtMn or IrMn, and are constructed sufficiently thick to allow them to be antiferromagnetic and to allow them to effectively exchange couple with the adjacent magnetic layer.

Figure 4:
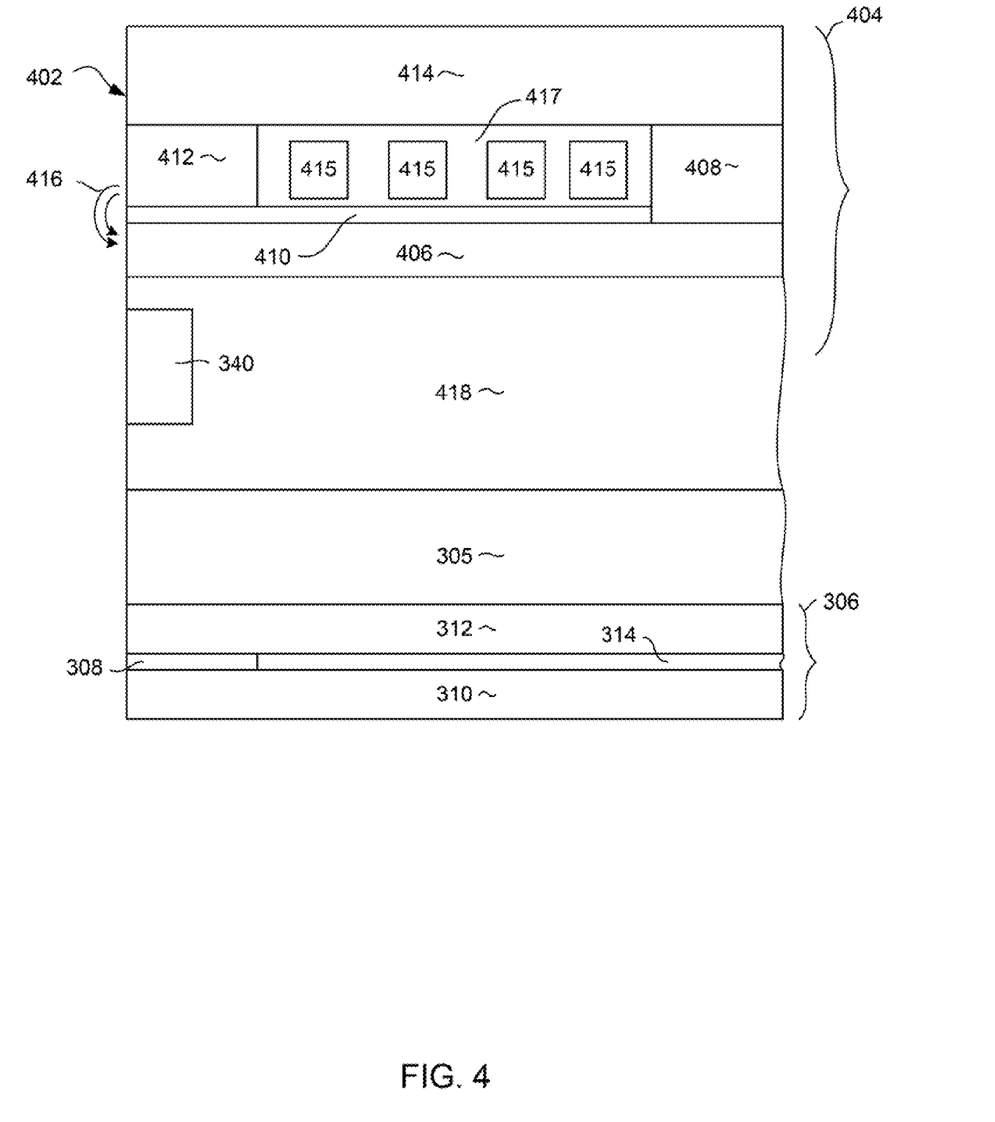
FIG. 4 is a cross sectional view of a longitudinal magnetic recording head according to another embodiment of the invention.

While the above description relates to the use of a wiggler structure 340 in a perpendicular magnetic head 302, such a wiggler structure can also be used in a longitudinal magnetic recording system. FIG. 4 illustrates a magnetic head 402 incorporating a wiggler structure 340. The use of the wiggler structure 340 in a longitudinal recording system is included herein for purposes of completeness, as the perpendicular magnetic recording system described above is preferred. The longitudinal magnetic recording head 402 includes a read head 306 and a magnetic write head 404, which may be separated from the read head 306 by a non-magnetic, electrically insulating spacer layer 305. The longitudinal write head 404 includes a first magnetic pole layer 406, and a magnetic back gap layer 408 connected with the first pole in a region removed from the air bearing surface ABS. For the wiggler structure 340 to provide significant benefit in such a longitudinal recording system, the pole layer 406 would preferably be relatively thin (e.g. less than 150 nm.) A non-magnetic write gap layer 410 is formed over the first pole, and a second pole layer 412 is formed over the write gap layer at the ABS such that the second pole layer 412 is separated from the first pole layer by the write gap layer 410. A third pole layer 414 formed over the second pole layer connects the second pole layer 412 with the back gap layer 408. A non-magnetic, electrically conductive write coil 415 passes between the first and third pole layers and between the back gap layer 408 and second pole layer 412. The coil 415 can be embedded in a dielectric layer 417 such as alumina. When electrical current flows through the write coil 415 the resulting magnetic field induces a magnetic flux in the magnetic yoke formed by the magnetic pole layers 406, 412, 414 and back gap 408. This magnetic flux, then, results in a magnetic fringing field 416 extending between the first and second magnetic poles 406, 412.

Figure 7:
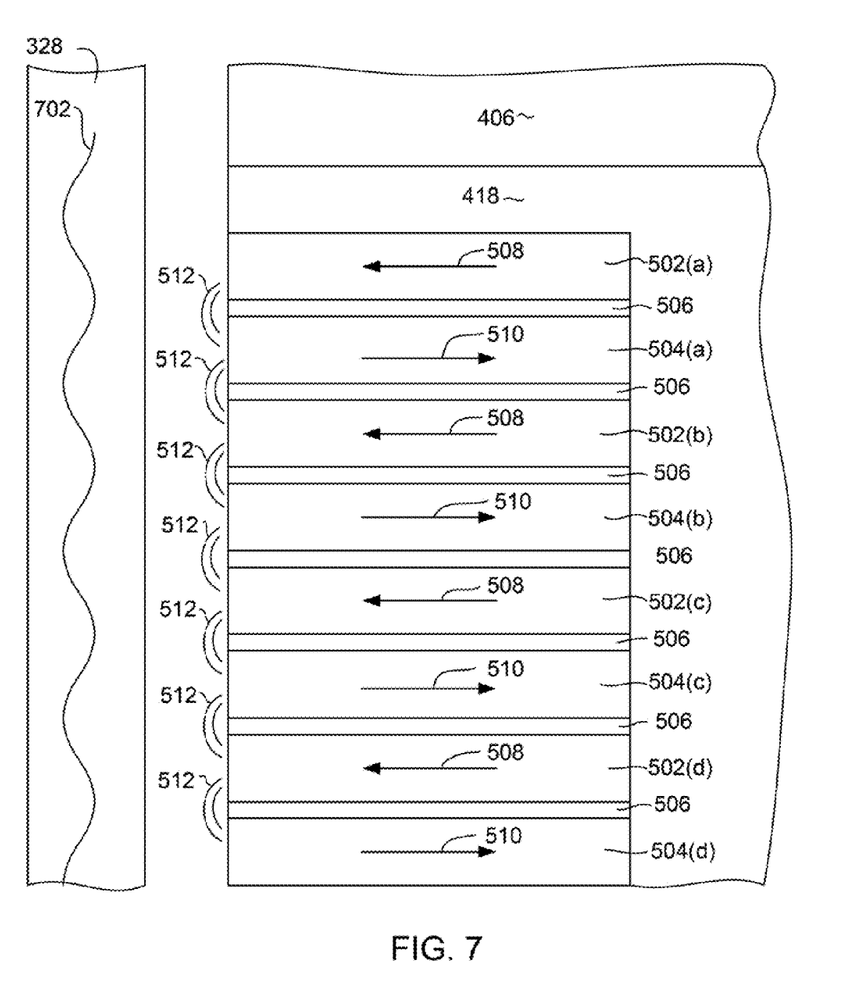
FIG. 7 is an enlarged view of a magnetic wiggler structure used in a longitudinal magnetic recording system.

The wiggler structure 340 is located just up-track from the write head 404, without actually contacting any of the magnetic structures of the write head 404 (i.e. 406, 408, 412, 414. The wiggler 340 can be embedded in a non-magnetic, electrically insulating material 418 such as alumina. With reference to FIG. 7, the magnetic fields 512 emitting from the wiggler structure 340 generated a ferromagnetic longitudinal resonance in the magnetic media 328 that is indicated by line 702. The oscillations 702 of the longitudinal magnetization of FIG. 7 are at approximately 90 degrees relative to the oscillations 514 of FIG. 5. The longitudinal oscillations improve switching of the magnetic media by the write head 404 described above with reference to FIG. 4.

Figure 8:
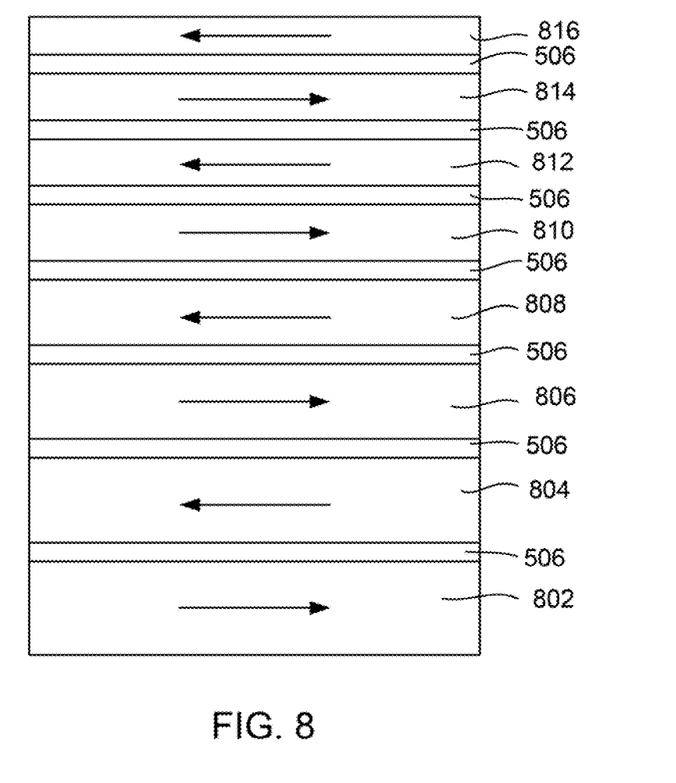
FIG. 8 is an enlarged view of a wiggler structure according to an alternate embodiment of the invention.

With reference now to FIG. 8, in another embodiment of the invention, a wiggler 802 can be constructed to have magnetic layers 802-816 that have varying thicknesses. For example, the magnetic layers 802-816 can have thickness that become progressively smaller. As before, the magnetic layers 802-816 are antiparallel coupled across non-magnetic antiparallel coupling layers 818, such as Ru, Rh, Ir, Cr, Re, V. Varying the thickness of the layers can produce broadband excitation with a frequency chirp. This may be beneficial for magnetic media in which the population of grains has a broad distribution of ferromagnetic resonance frequency (FMR frequency).

Figure 9:
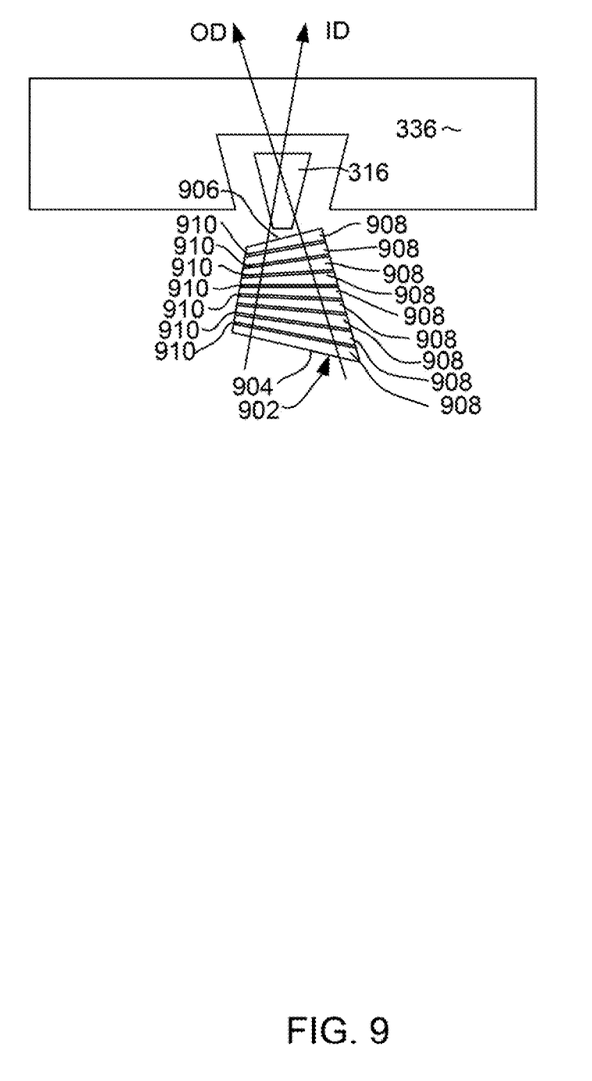
FIG. 9 is an enlarged view of a wiggler structure according to another alternate embodiment of the invention.

With reference now to FIG. 9 which shows an ABS view of a write head, a wiggler structure 902 can be constructed to have additional features. FIG. 9 shows an ABS view of a write pole 316 and a shield 336 of a write head 302 such as that described above with reference to FIG. 3. In one aspect of an additional feature, the wiggler structure 902 can be constructed to have a somewhat trapezoidal shape, wherein the wiggler structure has a leading edge 904 that is wider than its trailing edge 906. This can be useful for optimizing the performance of the wiggler structure 902 under various skew angles. In addition, addition, it can be seen that the wiggler 902 has a plurality of magnetic layers 908 that are separated by thin anti-parallel coupling layers 910 similar to the wiggler structures described above. However, in FIG. 9 the individual magnetic layers 908 can be constructed so as to each have a non-uniform thickness. That is, each layer 908 has is thinner at one end than at the other, having a constantly varying thickness across the width of the magnetic layer. For example, as shown in FIG. 9, each of the magnetic layers 908 is thinner at its left side and wider at its right side.

As those skilled in the art will appreciate, as the write head accesses data from various parts of a magnetic media, the skew of the head will cause the data track to be oriented differently relative to the write pole 316 and wiggler 902. By way of example, at the inner most diameter of the disk the data track will follow a path designated by arrow ID, whereas at the outermost diameter the data track will follow a path indicated by arrow OD. The non-uniform thickness of the magnetic layers allows the thickness of the layers to be adjusted for various skew locations. This allows the period of the magnetization from this layers to vary with skew angle.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A head for magnetic data recording, comprising:
    a magnetic write pole that extends to an air bearing surface;
    a magnetic wiggler structure disposed at the air bearing surface, the magnetic wiggler structure including a plurality of antiparallel coupled magnetic layers for initiating a high frequency magnetic field oscillation in a magnetic media passing thereby; and
    a non-magnetic spacer layer separating the wiggler structure from the write pole;
    wherein each of the magnetic layers has a thickness that varies across its width as viewed from the air bearing surface, such that each magnetic layer is thinner at a first side of the wiggler structure and thicker at a second side of the wiggler structure.

2. The head as in claim 1 wherein the wiggler structure is arranged relative to the write pole so as to initiate the high frequency magnetic field oscillation in a portion the magnetic media before that portion of the magnetic media reaches the write pole.

3. The head as in claim 1 wherein the wiggler structure includes a plurality of magnetic layers separated from one another by non-magnetic antiparallel coupling layers.

4. The head as in claim 3 wherein the wiggler structure includes at least four anti-parallel coupled magnetic layers.

5. The head as in claim 3 wherein at least some of the magnetic layers comprises one or more of the materials Co, Fe, CoFe, Cu, Ni or alloys thereof.

6. The head as in claim 3 wherein the non-magnetic anti-parallel coupling layers comprise Ru, Rh, Ir, Cr, Re, V or alloys thereof.

7. The head as in claim 1 wherein the wiggler structure does not contact any other magnetic structure.

8. The head as in claim 1 wherein the head further comprises a read head, and wherein the magnetic wiggler structure is separated from the read head, and does not contact any other magnetic structure.

9. The head as in claim 1 wherein the magnetic layers have thicknesses that vary from one another.

10. The head as in claim 1 wherein the magnetic layers progressively vary from one another from thinner to thicker.

11. A head as in claim 1 further comprising a layer of antiferromagnetic material exchange coupled with one of the magnetic layers.

12. A head as in claim 1 further comprising a first layer of antiferromagnetic material exchange coupled with a first one of the magnetic layers, and a second layer of antiferromagnetic material exchange coupled with a second one of the magnetic layers.

13. A head as in claim 1 wherein at least one of the magnetic layers is a hard magnetic material.

14. A head as claim 1 wherein at least one of the magnetic layers comprises CoPtCr.

15. A head for magnetic data recording, comprising:
a magnetic write pole that extends to an air bearing surface;
a magnetic wiggler structure disposed at the air bearing surface, the magnetic wiggler structure including a plurality of antiparallel coupled magnetic layers for initiating a high frequency magnetic field oscillation in a magnetic media passing thereby; and
a non-magnetic spacer layer separating the wiggler structure from the write pole;
wherein the magnetic wiggler structure has a width as viewed from the air bearing surface that varies such that the wiggler structure is wider at an end furthest from the write pole and narrower at a location closest to the write pole.

16. A head for magnetic data recording, comprising:
a magnetic write head including first and second magnetic poles extending to an air bearing surface and a non-magnetic material disposed between the first and second magnetic poles at the air bearing surface; wherein at least one of the first and second magnetic poles is a write pole;
a wiggler structure disposed at the air bearing surface, the wiggler structure including a plurality of antiparallel coupled magnetic layers for initiating a high frequency magnetic field oscillation in a magnetic media passing thereby, and wherein the wiggler structure does not contact any of the first and second magnetic poles and wherein the write pole has a leading edge and the wiggler structure is located adjacent to but separated from the leading edge of the write pole;
wherein each of the magnetic layers has a thickness that varies across its width as viewed from the air bearing surface, such that each magnetic layer is thinner at a first side of the wiggler structure and thicker at a second side of the wiggler structure.

17. The head as in claim 16 wherein the wiggler structure is arranged relative to the write head so as to initiate the high frequency magnetic field oscillation in a portion of the magnetic media before that portion of the magnetic media reaches the write head.

18. The head as in claim 16 wherein the wiggler structure includes a plurality of magnetic layers separated from one another by non-magnetic antiparallel coupling layers.

19. A head for magnetic data recording, comprising:
a magnetic write pole that extends to an air bearing surface;
a wiggler structure disposed at the air bearing surface, the wiggler structure including an array of permanently magnetized elements of alternating, antiparallel orientation wherein the write pole has a leading edge and the wiggler structure is located adjacent to but separated from the leading edge of the write pole; and
a non-magnetic spacer layer separating the wiggler structure from the write pole;
wherein each of the magnetic elements has a thickness that varies across its width as viewed from the air bearing surface, such that each magnetized element is thinner at a first side of the wiggler structure and thicker at a second side of the wiggler structure.

* * * * *